(12) United States Patent
Wang et al.

(10) Patent No.: US 9,106,727 B2
(45) Date of Patent: Aug. 11, 2015

(54) SIM CARD SEAT AND MOBILE TERMINAL

(71) Applicant: Xiaomi Inc., Beijing (CN)

(72) Inventors: Shaojie Wang, Beijing (CN); Jianjun Zhang, Beijing (CN); Shasha Shi, Beijing (CN); Fenghui Wu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/096,018

(22) Filed: Dec. 4, 2013

(65) Prior Publication Data

US 2014/0154903 A1    Jun. 5, 2014

Related U.S. Application Data

(63) Continuation-in-part of application No. PCT/CN2013/078925, filed on Jul. 5, 2013.

(30) Foreign Application Priority Data

Dec. 3, 2012   (CN) .......................... 2012 1 0511367

(51) Int. Cl.
*G06K 13/08*     (2006.01)
*H01R 13/633*    (2006.01)
(Continued)

(52) U.S. Cl.
CPC ............... *H04M 1/0202* (2013.01); *G06K 7/00* (2013.01); *H01R 27/00* (2013.01); *H04M 1/026* (2013.01)

(58) Field of Classification Search
CPC . G06K 13/08; G06K 13/0806; H01R 13/633; H01R 23/7005; H01R 13/62938; H01R 13/62955; H01R 13/62933
See application file for complete search history.

(56) References Cited

U.S. PATENT DOCUMENTS 6,814,597 B1 * 11/2004 Kao .............................. 439/159
6,951,470 B1    10/2005 Huang
(Continued)

FOREIGN PATENT DOCUMENTS

CN         202103241 U    1/2012
CN         202103259 U    1/2012
(Continued)

OTHER PUBLICATIONS

"International Search Report for PCT/CN2013/078925".

*Primary Examiner* — Gary Paumen
(74) *Attorney, Agent, or Firm* — Jun He Law Offices P.C.; James J. Zhu

(57) ABSTRACT

The present disclosure provides a SIM card seat and a mobile terminal, which belongs to the electronic technical field. The SIM card seat is used for receiving a SIM card, which comprises a housing, a signal conducting terminal, a card holder and a ejector. The signal conducting terminal is disposed on the motherboard. A receiving space is formed between an area of the motherboard where the signal conducting terminal is located and the housing, which is used for receiving the card holder and ejector. The card holder is used for receiving the SIM card and matching different types of SIM cards. The ejector is used for ejecting the card holder out of the receiving space. The mobile terminal comprises the SIM card seat. The SIM card seat according to the present disclosure can match different types of SIM cards by changing the card holder, thus the mobile terminal having the SIM card can match various SIM cards accordingly. Therefore, it is not required for the user to change the SIM card to match various mobile phones, which is convenient for the user, and reduces waste of resources.

6 Claims, 7 Drawing Sheets

(51) Int. Cl.
*H04M 1/02* (2006.01)
*G06K 7/00* (2006.01)
*H01R 27/00* (2006.01)

(56) References Cited

U.S. PATENT DOCUMENTS

| | | | |
|---|---|---|---|
| 7,192,292 B1 | 3/2007 | Su | |
| 8,337,223 B2* | 12/2012 | Gao et al. | 439/159 |
| 8,662,907 B1* | 3/2014 | Lin | 439/159 |
| 8,696,370 B1* | 4/2014 | Lin et al. | 439/159 |
| 2004/0038570 A1* | 2/2004 | He | 439/159 |
| 2004/0067669 A1* | 4/2004 | Akasaka et al. | 439/159 |
| 2004/0087194 A1* | 5/2004 | Wang et al. | 439/159 |
| 2005/0142913 A1* | 6/2005 | Cheng | 439/159 |
| 2008/0096410 A1* | 4/2008 | Cheng | 439/159 |
| 2011/0070760 A1* | 3/2011 | Zhang | 439/159 |
| 2012/0083145 A1* | 4/2012 | Gao et al. | 439/155 |
| 2012/0276764 A1* | 11/2012 | Nakase et al. | 439/159 |

FOREIGN PATENT DOCUMENTS

| | | |
|---|---|---|
| CN | 202196894 U | 4/2012 |
| CN | 102709725 A | 10/2012 |
| CN | 202564731 U | 11/2012 |
| CN | 103001079 A | 3/2013 |
| CN | 202977922 U | 6/2013 |
| JP | 2012-3920 A | 1/2012 |

* cited by examiner

SIM CARD SEAT AND MOBILE TERMINAL

CROSS REFERENCE TO RELATED APPLICATIONS

This application is a Continuation-In-Part of International Application PCT/CN 2013/078925, with an international filing date of Jul. 5, 2013, which claims priority to Chinese Patent Application No. 201210511367.0, filed on Dec. 3, 2012, both of which are hereby incorporated by reference in their entireties.

TECHNICAL FIELD

The present disclosure generally relates to an electronic product, and more particularly, to a SIM card seat and a mobile terminal.

BACKGROUND

A SIM card is an abbreviation for "Subscriber Identity Module card", which can also be called smart card or ID card. The SIM card can store user's data, authentication algorithm and key for identifying the subscriber identity by a GSM system. A mobile phone cannot be used without the SIM card. The SIM card is usually positioned in a SIM card seat of the mobile phone.

With the progress of science and the development of mobile communication, the mobile phone is continuously updated in construction, design and performance. In the present market, there are lots of types of mobile phones, and also lots of types of SIM cards fit for the mobile phones. For example, most types of mobile phones use a normal SIM card, while IPHONE 4 and IPHONE 4s use a Micro SIM card, and IPHONE 5 uses a Nano SIM card. The conventional SIM card seat has a card case for receiving the SIM card, and a signal terminal for conducting with the SIM card.

Due to the structural limitation, the SIM card seat of a type of mobile phone can only match a corresponding type of SIM card. That is, one type of mobile phone can only be suitable to receive one type of SIM card. For example, for IPHONE 4, the Micro SIM card cannot be replaced with a Mini SIM card. Therefore, when a user changes his/her mobile phone, he or she has to choose a mobile phone having the same type of SIM card seat in the case that he or she does not want to change the SIM card. Or the user has to give up his/her original SIM card to choose a mobile phone having a different type of SIM card seat to fit for a different type of SIM card, which may be inconvenient for the user and result in waste of resources.

SUMMARY

In order to solve the existing technical problem, the present disclosure provides a SIM card seat and a mobile terminal. The SIM card seat can match different types of SIM cards, and therefore it is not required for the user to change the original SIM card to match different types of mobile phones.

In an aspect, the present disclosure provides a SIM card seat, positioned on a motherboard and configured to receive a SIM card, the SIM card seat comprising a housing, a signal conducting terminal, a card holder and an ejector, wherein the signal conducting terminal is disposed on the motherboard and configured to conduct with the SIM card, a receiving space is formed between an area of the motherboard where the signal conducting terminal is located and the housing, which is configured to receive the card holder and the ejector, the card holder is configured to receive the SIM card and match different types of SIM cards, the ejector is configured to eject the card holder out of the SIM card seat from the receiving space.

For example, the card holder comprises a first side and a second side adjacent to the first side, and the ejector comprises: a second rod positioned at the second side and rotatable in the plane of the SIM card seat; a first rod positioned at the first side and movable in a direction substantially perpendicular to the second rod to make the second rod rotate via the engagement there between; and a push pin configured to drive the first rod to move in the direction substantially perpendicular to the second rod.

For example, the ejector has switchably a normal state and a working state, wherein: in the normal state, the first rod and second rod are positioned perpendicular to each other in the receiving space, wherein an end of the first rod is positioned close to a head of the second rod, and wherein the first and second rods are parallel to the first and second sides of the card holder, respectively, and in the working state, the push pin is applied to the first rod, such that the first rod moves in a direction along which the push pin is applied and drives the second rod to move in a levering motion manner, wherein an end of the second rod acts as a force bearing point that applies to an inner side of the card holder to make the card holder move outwardly relative to the receiving space, wherein the inner side is a side of the card holder relative to the inside of the receiving space.

For example, the card holder comprises a body having a recess for receiving the SIM card.

For example, the card holder is integrally structured.

For example, the card holder is separately structured.

For example, the body comprises a frame and an insert block which are connected to each other in a separate manner, wherein the frame is configured to receive the insert block, and the recess is disposed in the insert block.

In another aspect, the present disclosure provides a mobile terminal, comprising a SIM card seat for receiving a SIM card, and a motherboard on which the SIM card seat is positioned, wherein the SIM card seat comprises a housing, a signal conducting terminal, a card holder and an ejector, the signal conducting terminal is disposed on the motherboard for conducting with the SIM card, a receiving space is formed between an area of the motherboard where the signal conducting terminal is located and the housing, which is configured to receive the card holder and the ejector, the card holder is configured to receive the SIM card and match different types of SIM cards, the ejector is configured to eject the card holder out of the SIM card seat from the receiving space.

For example, the card holder comprises a first side and a second side adjacent to the first side, and the ejector comprises: a second rod positioned at the second side and rotatable in the plane of the SIM card seat; a first rod positioned at the first side and movable in a direction substantially perpendicular to the second rod to make the second rod rotate via the engagement there between; and a push pin configured to drive the first rod to move in the direction substantially perpendicular to the second rod.

For example, the ejector has switchably a normal state and a working state, wherein: in the normal state, the first rod and second rod are positioned perpendicular to each other in the receiving space, wherein an end of the first rod is positioned close to a head of the second rod, and wherein the first and second rods are parallel to the first and second sides of the card holder, respectively, and in the working state, the push pin is applied to the first rod, such that the first rod moves in a direction along which the push pin is applied and drives the second rod in a levering motion manner, wherein an end of the second rod acts as a force bearing point that applies to an inner side of the card holder to make the card holder move outwardly relative to the receiving space, wherein the inner side is a side of the card holder relative to the inside of the receiving space.

For example, the card holder comprises a body having a recess for receiving the SIM card.

For example, the card holder is integrally structured.

For example, the card holder is separately structured.

For example, the body comprises a frame and an insert block which are connected to each other in a separate manner, wherein the frame is configured to receive the insert block, and the recess is disposed in the insert block.

The technical solutions of the present disclosure have the following beneficial effects. According to the present embodiments, the card holder can be ejected out of the receiving space by the ejector. Then the SIM card seat may match different types of SIM cards by changing different card holders, thereby matching a mobile terminal having the SIM card seat with different types of SIM cards. Therefore, it is not required for the user to change his/her original SIM card to match various mobile phones, which is convenient for the user and reduces waste of resources.

It is to be understood that both the foregoing general description and the following detailed description of the present disclosure are exemplary and explanatory, and are intended to provide further explanation of the invention as claimed.

BRIEF DESCRIPTION OF THE DRAWINGS

The foregoing and other features and advantages of the present disclosure will be apparent to those skilled in the art in view of the following detailed description, taken in conjunction with the accompanying drawings. The drawings are for illustrative purposes for some embodiments only. It is obvious to the person skilled in the art that other drawing may be obtained based on the drawing in the present embodiment without any creative labor.

Figure 1:
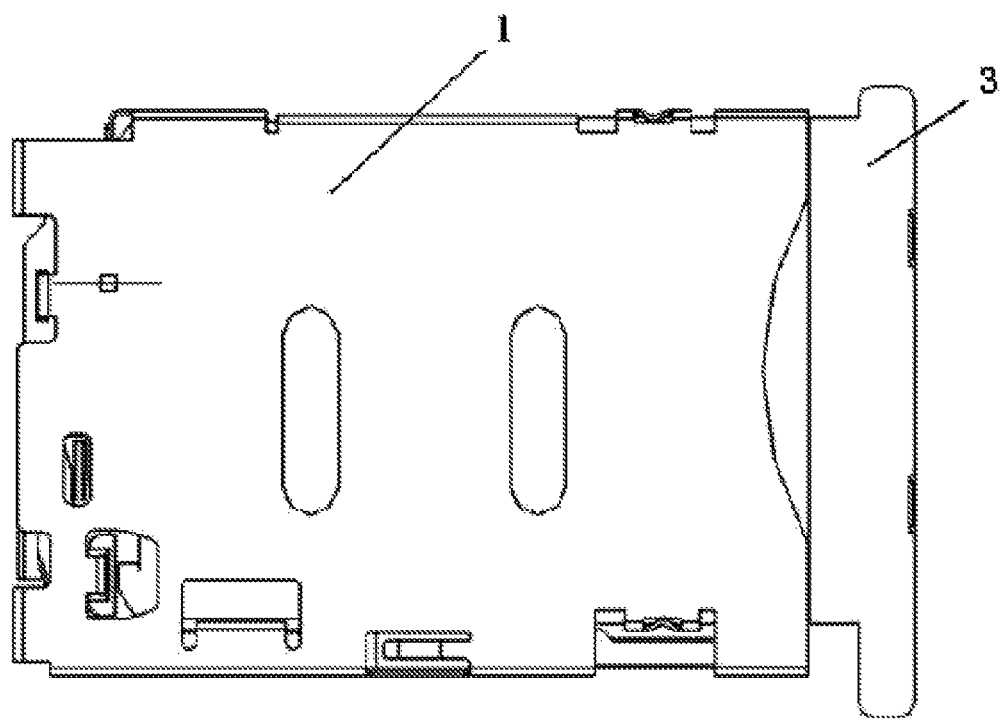
FIG. 1 illustrates a front view of a SIM card seat according to an embodiment of the present disclosure.

Specific embodiments in this present disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

SYMBOLS AND RELATED ELEMENTS 1 housing
2 signal conducting terminal
3 card holder
31 body
31A frame
31B insert block
32 recess
33 hole
4 ejector
41 first rod
41A head of the first rod
41B end of the first rod
42 second rod
42A head of the second rod
42B end of the second rod
43 push pin
50 SIM card seat
60 SIM card
70 motherboard
100 mobile terminal

DETAILED DESCRIPTION

In the following detailed description, reference is made to various specific embodiments of the present disclosure. These embodiments are described with sufficient details to enable those skilled in the art to practice the present disclosure. It is to be understood that other embodiments may be employed, and that various structural, logical, and electrical changes may be made without departing from the spirit or scope of the present disclosure. Wherever possible, the same reference numbers will be used throughout the drawings to refer to the same or like parts.

As used herein, a "terminal" may be implemented using a variety of terminal devices. Examples of such terminal devices include mobile phones, computers, digital broadcast terminals, messaging devices, gaming consoles, tablets, pads, medical devices, exercise equipment, personal digital assistants, and the like.

Embodiment 1

Figure 2:
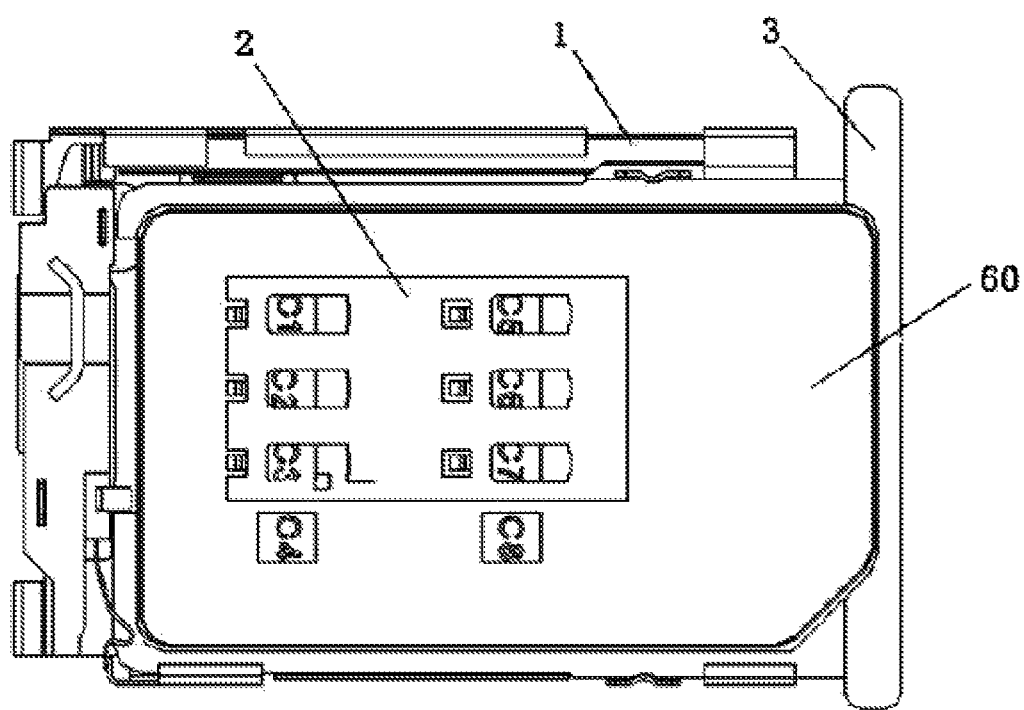
FIG. 2 illustrates a back view of the SIM card seat of FIG. 1.
Figure 3:
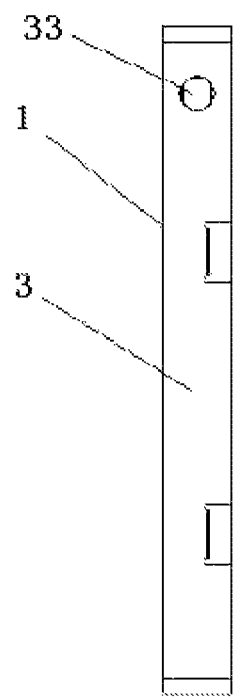
FIG. 3 illustrates a right view of the SIM card seat of FIG. 1.
Figure 4:
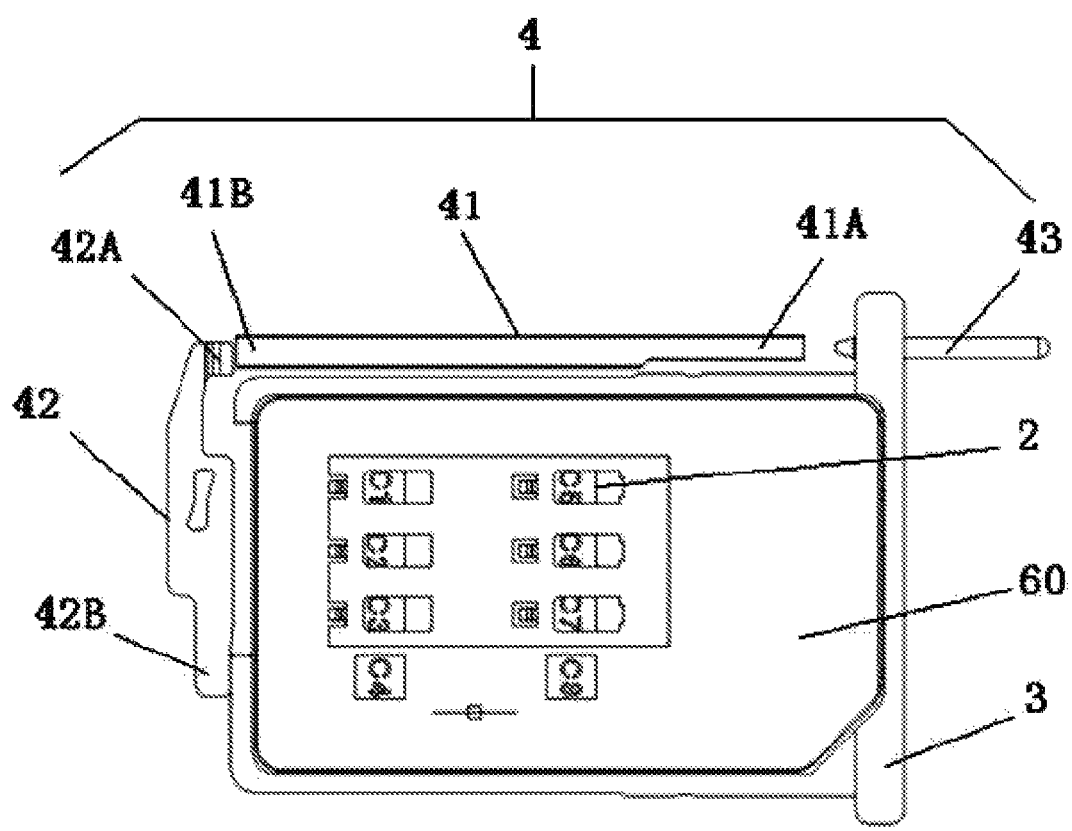
FIG. 4 illustrates an assembly drawing of a SIM card, a signal conducting terminal, a card holder and an ejector according to an embodiment of the present disclosure.

As shown in FIG. 1 and also referring to FIGS. 2 to 4, the present disclosure is illustrated mainly based on FIG. 2. The present embodiment of the disclosure provides a SIM card seat which is for receiving a SIM card 60. The SIM card seat may be positioned on a motherboard (not shown) of the terminal device. The SIM card seat comprises a housing 1, a signal conducting terminal 2, a card holder 3 and an ejector 4 (referring to FIG. 4). The signal conducting terminal 2 is disposed on the motherboard to conduct with the SIM card 60. It is contemplated that the SIM card seat may have one or more signal conducting terminals 2, which are isolated from each other and used for conduction with corresponding terminals or nodes at the SIM card 60. A receiving space is formed between the housing 1 and the area of the motherboard where the signal conducting terminal 2 is located, and the receiving space is used for receiving the card holder 3 and the ejector 4 (referring to FIG. 4). The card holder 3 is used for receiving the SIM card 60 and matching different types of SIM cards. The ejector 4 (referring to FIG. 4) is used for ejecting the card holder 3 out of the SIM card seat from the receiving space.

As shown in FIG. 2, according to an embodiment of the present disclosure, the card holder 3 can be ejected out of the receiving space by the ejector 4, and can be replaced by a different type of card holder. In this way, the SIM card seat can match different types of SIM cards 60, thereby the mobile terminal having the SIM card 60 can match various SIM cards. Therefore, it is not required to change the original SIM card 60 to match various mobile phones, which is convenient for the user, provides better user experience, and reduces waste of resources.

For example, as shown in FIG. 2, in the present embodiment, an area of the motherboard where the signal conducting terminal 2 is located is integrally structured with the housing. For example, the housing 3 may be secured with the motherboard, for example, via threaded connection.

It will be appreciated by people skilled in the art that, the area of the motherboard where signal conducting terminal 2 is located may be separately structured with the housing, for example, via clip connection.

For example, as shown in FIG. 4, in the present embodiment, the ejector 4 comprises a first rod 41, a second rod 42 and a push pin 43. The first rod 41 and the second rod 42 are positioned at two adjacent sides of the card holder, respectively. The second rod 42 is rotatable clockwise or counterclockwise in the plane of the card seat, i.e. the plane of FIG. 4. The first rod 41 is movable in a direction substantially perpendicular to the second rod 42, such that the first rod 41 can operatively engage with the second rod 42 to make the second rod 42 rotate. The first rod 41 may move in response to a driving force exerted via the push pin 43. The ejector 4 may have switchably a normal state and a working state according to the engagement between the first and second rods.

In the normal state, the first rod 41 and second rod 42 are positioned perpendicular to each other in the receiving space. An end 41B of the first rod is close to a head 42A of the second rod, and the first rod 41 and the second rod 42 are parallel to two adjacent sides of the card holder, respectively. As the second rod 42 are substantially parallel with the inner side (left side in FIG. 4) of the card holder, the second rod 42 may not enter into the receiving space, thereby not affecting the position of the SIM card 60. Then the SIM card 60 can be completely received within receiving space.

In the working state, the push pin 43 is applied to the first rod 41 by an external force, for example, such that the first rod 41 moves in a direction along which the push pin is applied, i.e. the horizontal direction of FIG. 4. Then the first rod 41 drives the second rod 42 to rotate, i.e. to move in a levering motion manner. As shown in FIG. 4, the second rod 42 rotates counterclockwise such that its end 42B engages with the inner side of the card holder. Further, the end 42B of the second rod acts as a force bearing point acting on the inner side of the card holder to make the card holder move outwardly relative to the receiving space. The inner side of the card holder is the side relative to the inside of the receiving space.

It should be noted that, the terms "head" and "end" are defined relatively. In the present embodiment, the end part of the first rod 41 that contacts the push pin 43 is defined as the head of the first rod 41, thus the other end part of the first rod 41 is defined as the end of the first rod 41. The end part of the second rod 42 that contacts the first rod 41 is defined as the head of the second rod 42, thus the other end part of second rod 42 is defined as the end of the second rod 42.

It will be appreciated by people skilled in the art that, the ejector 4 is not limited to the above structure, other structures such as an elastic piece can be used.

As shown in FIG. 4, the installation of the SIM card 60 includes: positioning the SIM card 60 on the card holder 3, and inserting the card holder 3 with the SIM card 60 into the receiving space, such that the SIM card 60 is installed. The replacement of the SIM card 60 includes: pushing the push pin 43 leftward (in the direction of FIG. 4) and through the card holder 3 to make the push pin 43 against the head 41A of the first rod of the ejector 4; further moving the first rod 41 leftward via the force exerted by the push pin 43 until the end 41B of the first rod contacts the head 42A of the second rod 42 to make the second rod 42 move in a levering motion manner, such that the card holder 3 is ejected out of the receiving space via the rightward movement of the end 42B of the second rod. Then the SIM card 60 can be replaced. It is unnecessary to replace the card holder 3 if the type of the SIM card 60 is not changed, whereas it is necessary to replace the card holder 3 if the type of the SIM card 60 is changed.

Figure 5:
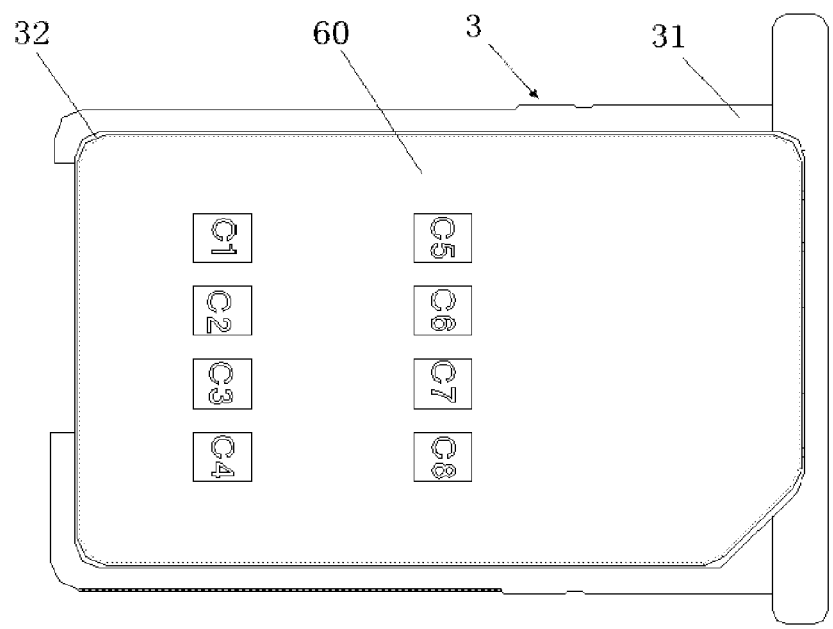
FIG. 5 illustrates a card holder according to an embodiment of the present disclosure.

For example, as shown in FIG. 5, the card holder 3 comprises a body 31, which is provided with a recess 32 for receiving the SIM card 60.

Figure 6:
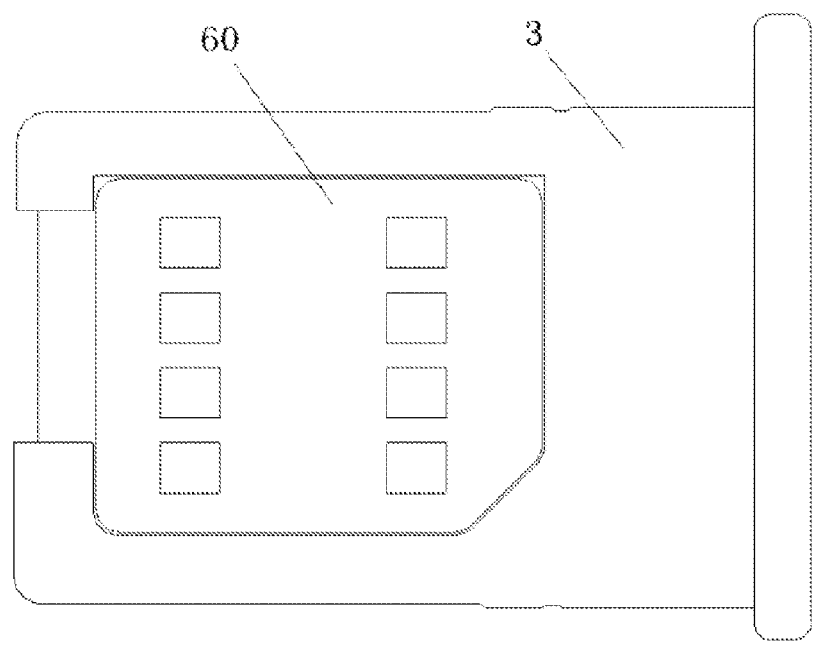
FIG. 6 illustrates a card holder according to another embodiment of the present disclosure.
Figure 7:
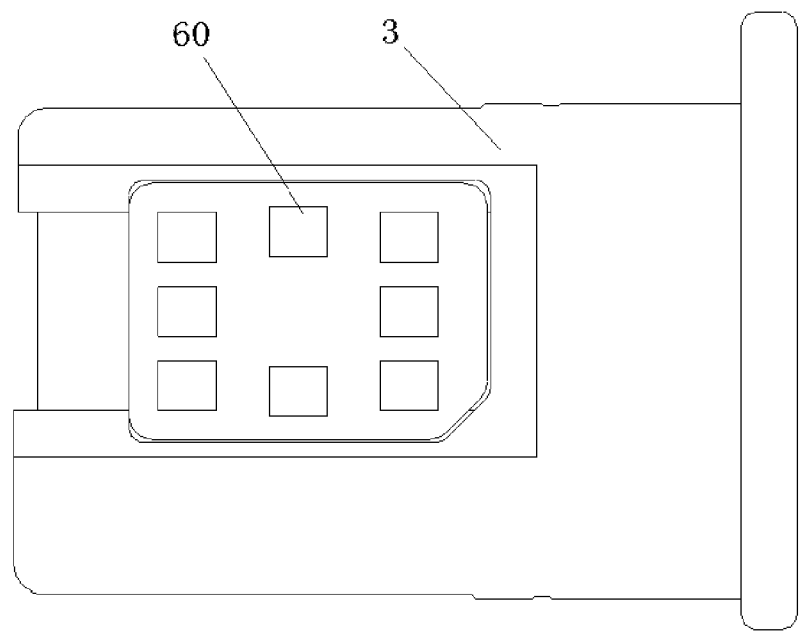
FIG. 7 illustrates a card holder according to still another embodiment of the present disclosure.

For example, as shown in FIGS. 5 to 7, the card holder 3 is integrally structured, that is, the body 31 is integrally structured.

As shown in FIG. 3, a hole 33 is provided in the body 31 of the card holder 3, which is used to pass the push pin 43 and guide its movement (as shown in FIG. 4).

As shown in FIG. 5, in the present embodiment, the card holder 3 may match a Mini SIM card.

As shown in FIG. 6, in the present embodiment, the card holder 3 may match a Micro SIM card.

As shown in FIG. 7, in the present embodiment, the card holder 3 may match a Nano SIM card.

Figure 8:
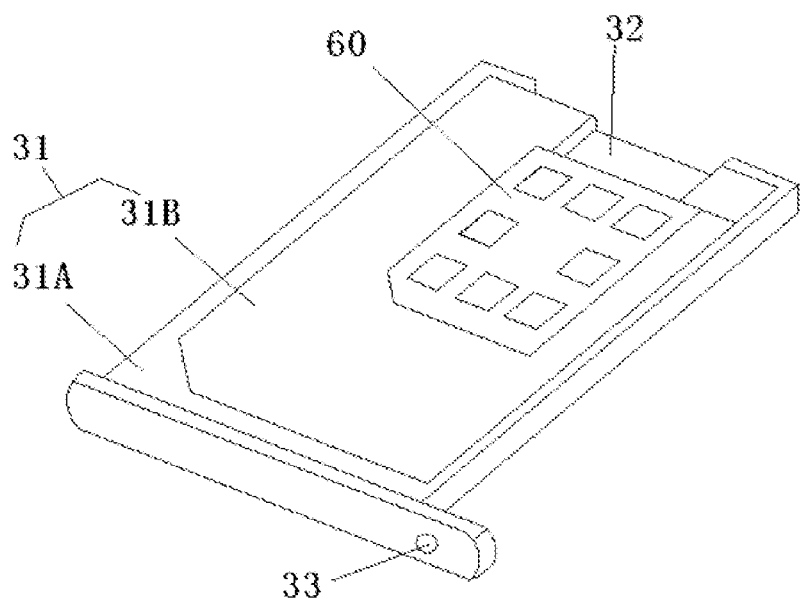
FIG. 8 illustrates a card holder according to yet another embodiment of the present disclosure.

As shown in FIG. 8, the card holder 3 is separately structured. That is to say, the components of the card holder 3 are not completely secured with each other.

As shown in FIG. 8, the body 31 is separately structured. The body 31 has a frame 31A and an insert block 31B which are connected to each other in a separate manner. The insert block 31B may be removed from the frame 31A and replaced by a different one when required. The frame 31A is used for receiving the insert block 31B. The insert block 31B is provided with a recess 32 for matching the SIM card 60. In the present embodiment, the card holder can match different types of SIM cards 60 by changing different insert blocks 31B.

Embodiment 2

Figure 9:
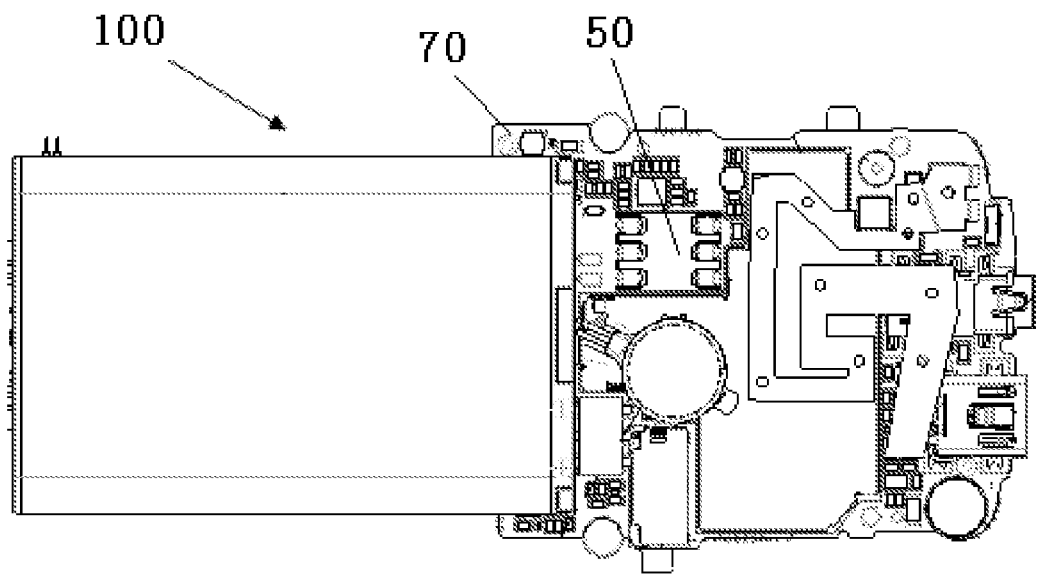
FIG. 9 illustrates a schematic of a mobile terminal according to an embodiment of the present disclosure.

As shown in FIG. 9, the present embodiment provides a mobile terminal 100 which comprises a SIM card seat 50 for receiving a SIM card 60 (as shown in FIG. 2), and a motherboard 70 on which the SIM card seat 50 is positioned. Referring to FIG. 2, the SIM card seat comprises a housing 1, a signal conducting terminal 2, a card holder 3 and an ejector 4 (as shown in FIG. 4). The signal conducting terminal 2 is mounted on the motherboard 70 (as shown in FIG. 9) for conducting with the SIM card 60. A receiving space (not shown) is formed between an area of the motherboard where the signal conducting terminal 2 is located and the housing 1, and the receiving space is used for receiving the card holder 3 and the ejector 4 (as shown in FIG. 4). The card holder 3 is used for receiving the SIM card 60 and matching different types of SIM cards. The ejector 4 (as shown in FIG. 4) is used for popping the card holder 3 out of the SIM card seat from the receiving space.

As shown in FIG. 2, according to an embodiment of the present disclosure, the card holder 3 can be ejected out of the receiving space by the ejector 4, and be replaced by a different type of card holder 3. In this way, the SIM card seat 50 (as shown in FIG. 9) can match different types of SIM cards 60, thereby the mobile terminal 100 (as shown in FIG. 9) having the SIM card 60 can match various SIM cards. Therefore, it is not required to change the original SIM card 60 to match various mobile phones, which is convenient for the user, provides better user experience, and reduces waste of resources.

For example, as shown in FIG. 2, in the present embodiment, the area of the motherboard where the signal conducting terminal 2 is integrally structured with the housing.

It will be appreciated by people skilled in the art that, an area of the motherboard where signal conducting terminal 2 is located may be separately structured with the housing, for example, via clip connection.

For example, as shown in FIG. 4, in the present embodiment, the ejector 4 comprises a first rod 41, a second rod 42 and a push pin 43. The ejector 4 may have switchably a normal state and a working state according to the engagement of the first and second rods.

In the normal state, the first rod 41 and second rod 42 are positioned perpendicular to each other in the receiving space. An end 41B of the first rod is close to the head 42A of the second rod, and the first rod 41 and the second rod 42 are parallel to two adjacent sides of the card holder, respectively.

In the working state, the push pin 43 is applied to the first rod 41 such that the first rod 41 moves in a direction along which the push pin is applied. Then the first rod 41 drives the second rod 42 to rotate, i.e., to move in a levering motion manner. As shown in FIG. 4, the second rod 42 rotates counterclockwise such that its end 42B engages with the inner side of the card holder. Further, the end 42B of the second rod acts as a force bearing point acting on the inner side of the card holder to make the card holder move outwardly relative to the receiving space. The inner side of the card holder is the side relative to the inside of the receiving space. It should be noted that, the terms "head" and "end" are defined relatively. In the present embodiment, the end part of the first rod 41 that contacts the push pin 43 is defined as the head of the first rod 41, thus the other end part of the first rod 41 is defined as the tail end of the first rod 41. The end part of the second rod 42 that contacts the first rod 41 is defined as the head of the second rod 42, thus the other end part of second rod 42 is defined as the tail end of the second rod 42.

It will be appreciated by people skilled in the art that the ejector 4 is not limited to the above structure, other structures such as an elastic piece can be used.

As shown in FIG. 4, the installation of the SIM card 60 includes: positioning the SIM card 60 on the card holder 3, and inserting the card holder 3 with the SIM card 60 into the receiving space, such that the SIM card 60 is installed. The replacement of the SIM card 60 includes: pushing the push pin 43 leftward and through the card holder 3 to make the push pin 43 against the head 41A of the first rod of the ejector 4; further moving the first rod 41 leftward via the force exerted by the push pin 43 until the end 41B of the first rod contacts the head 42A of the second rod 42 to make the second rod 42 move in a levering motion manner, such that the card holder 3 is ejected out of the receiving space via the rightward movement of the end 42B of the second rod. Then the SIM card 60 can be replaced. It is unnecessary to replace the card holder 3 if the type of the SIM card 60 is not changed, whereas it is necessary to replace the card holder 3 if the type of the SIM card 60 is changed.

As shown in FIG. 5, the card holder 3 comprises a body 31, which is provided with a recess 32 for receiving the SIM card 60.

As shown in FIGS. 5 to 7, the card holder 3 is integrally structured, that is, the body 31 is integrally structured.

For example, as shown in FIG. 3, a hole 33 is provided in the body 31 of the card holder 3, which is used to pass the push pin 43 and guide its movement (as shown in FIG. 4).

As shown in FIG. 5, in the present embodiment, the card holder 3 may match Mini SIM card.

As shown in FIG. 6, in the present embodiment, the card holder 3 may match Micro SIM card.

As shown in FIG. 7, in the present embodiment, the card holder 3 may match Nano SIM card.

For example, as shown in FIG. 8, the card holder 3 is separately structured. That is to say, the components of the card holder 3 are not completely secured with each other.

For example, as shown in FIG. 8, the body 31 is separate structured. The body 31 comprises a frame 31A and an insert block 31B which are connected to each other in a separate manner. The frame 31A is used for receiving the insert block 31B. The insert block 31B is provided with a recess 32 for matching the SIM card 60. In the present embodiment, the card holder can match different types of SIM cards 60 by changing insert blocks 31B.

The sequence of the embodiments is for illustration only and does not relate to their performances.

The foregoing description, for purpose of explanation, has been described with reference to embodiments. The present disclosure may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A SIM card seat, positioned on a motherboard and for receiving a SIM card, the SIM card seat comprising a housing, a signal conducting terminal, a card holder and an ejector, wherein the signal conducting terminal is disposed on the motherboard for conducting with the SIM card; a receiving space is formed between an area of the motherboard where the signal conducting terminal is located and the housing, which is configured to receive the card holder and the ejector, the card holder is configured to receive the SIM card and match different types of SIM cards, the ejector is configured to eject the card holder out of the SIM card seat from the receiving space, wherein the card holder comprises a body having a recess for receiving the SIM card, and the body further comprises a frame and an insert block which are connected to each other in a separate manner, and wherein the frame is configured to receive the insert block, and the recess is disposed in the insert block.

2. The SIM card seat according to claim 1, wherein the card holder further comprises a first side and a second side adjacent to the first side, and the ejector comprises:
   a second rod positioned at the second side and rotatable in the plane of the SIM card seat;
   a first rod positioned at the first side and movable in a direction substantially perpendicular to the second rod to make the second rod rotate via the engagement there between; and
   a push pin configured to drive the first rod to move in the direction substantially perpendicular to the second rod.

3. The SIM card seat according to claim 2, wherein the ejector has switchably a normal state and a working state, wherein:
   in the normal state, the first rod and second rod are positioned perpendicular to each other in the receiving space, wherein an end of the first rod is positioned close to a head of the second rod, and wherein the first and second rods are parallel to the first and second sides of the card holder, respectively, and in the working state, the push pin is applied to the first rod, such that the first rod moves in the direction along which the push pin is applied and drives the second rod to move in a levering motion manner, wherein an end of the second rod acts as a force bearing point that applies to an inner side of the card holder to make the card holder move outwardly relative to the receiving space, wherein the inner side is a side of the card holder relative to the inside of the receiving space.

4. A mobile terminal, comprising a SIM card seat for receiving a SIM card, and a motherboard on which the SIM card seat is positioned, wherein the SIM card seat comprises a housing, a signal conducting terminal, a card holder and an ejector, the signal conducting terminal is disposed on the motherboard for conducting with the SIM card, a receiving space is formed between an area of the motherboard where the signal conducting terminal is located and the housing, which is configured to receive the card holder and the ejector, the card holder is configured to receive the SIM card and match different types of SIM cards, the ejector is configured to eject the card holder out of the SIM card seat from the receiving space, wherein the card holder comprises a body having a recess for receiving the SIM card, and the body further comprises a frame and an insert block which are connected to each other in a separate manner, and wherein the frame is configured to receive the insert block, and the recess is disposed in the insert block.

5. The mobile terminal according to claim 4, wherein the card holder further comprises a first side and a second side adjacent to the first side, and the ejector comprises:

a second rod positioned at the second side and rotatable in the plane of the SIM card seat;

a first rod positioned at the first side and movable in a direction substantially perpendicular to the second rod to make the second rod rotate via the engagement there between; and a push pin configured to drive the first rod to move in the direction substantially perpendicular to the second rod.

6. The mobile terminal according to claim 5, wherein the ejector has switchably a normal state and a working state, wherein:

in the normal state, the first rod and second rod are positioned perpendicular to each other in the receiving space, wherein an end of the first rod is positioned close to a head of the second rod, and wherein the first and second rods are parallel to the first and second sides of the card holder, respectively, and in the working state, the push pin is applied to the first rod, such that the first rod moves in a direction along which the push pin is applied and drives the second rod in a levering motion manner, wherein an end of the second rod acts as a force bearing point that applies to an inner side of the card holder to make the card holder move outwardly relative to the receiving space, the inner side is a side of the card holder relative to the inside of the receiving space.

* * * * *